United States Patent  [15] 3,666,740
Kargin et al. [45] May 30, 1972

[54] METHOD OF PRODUCING HIGH MOLECULAR POLYALLYL ALCOHOL

[72] Inventors: Valentin Alexeevich Kargin, ulitsa Gaidara, 7, kv. 4; Lev Solomonovich Polak, Jugo-Zapad, kvartal 42a, 15, kv. 22; Viktor Alexandrovich Kabanov, Karetny ryad, 5/9, kv. 21; Vitaly Pavlovich Zubov, Rostovskaya naberezhnaya, 5, kv. 200; Valentina Fedorovna Pankova, Daev pereulok, 6, kv. 15, all of Moscow, U.S.S.R.

[22] Filed: Aug. 14, 1969

[21] Appl. No.: 850,232

[52] U.S. Cl. ................260/91.3 R, 260/80 M, 260/91.3 PV, 260/91.3 VA, 204/159.22, 204/159.23, 204/159.24
[51] Int. Cl. .................................................C08f 1/80, C08f 3/36
[58] Field of Search.................................................260/91.3

[56] References Cited

UNITED STATES PATENTS 2,904,484  9/1959  Houston et al..........................204/154
3,285,897  11/1966  Sullivan et al. ........................260/91.3

Primary Examiner—Joseph L. Schofer
Assistant Examiner—Stanford M. Levin
Attorney—Waters, Roditi, Schwartz & Nissen

[57] ABSTRACT

A method of producing high-molecular weight polyallyl alcohol by polymerizing allyl alcohol in the presence of an inorganic complexing agent that forms a coordination bond with the functional group of the monomer under the effect of a radical initiator. Suitable complexing agents include salts of metals of Groups I and II of the Periodic Table or acids, e.g., HCl HNO$_3$, H$_2$SO$_4$, etc.

16 Claims, No Drawings

METHOD OF PRODUCING HIGH MOLECULAR POLYALLYL ALCOHOL

The present invention relates to methods of producing polymeric materials and, more particularly, to methods of producing polyallyl alcohol which can find application in various industries, e.g., in the textile industry for sizing fabrics, for finishing glass fiber, in the chemical industry for making ion-exchange membranes, as an adhesive, in the manufacture of packing material, etc. In its heat and chemical resistance, as well as in some other characteristics, polyallyl alcohol substantially excels polyvinyl alcohol which is similar to it in its properties and which is used in the above industries and produced in large amounts.

So far it has not been possible to produce high-molecular weight polyallyl alcohol by direct polymerization of the monomer, viz., allyl alcohol. This is associated with the fact, that allyl alcohol is one of the monomers which are very difficult to polymerize, although it is a cheap product of a large-scale organic synthesis.

It is known to produce high-molecular weight polyallyl alcohol of mol. wt. ca. $4 \times 10^5$ by reducing polyacrylic acid derivatives with complex hydrides of metals in solvents.

This method, however, involves many stages and requires the use of expensive reagents.

A number of attempts have been made to produce high-molecular weight polyallyl alcohol by direct polymerization of allyl alcohol. Thus, U.S. Pat. No. 3,285,897 (1966) teaches the production of solid high-molecular weight polyallyl alcohol from the monomer under a pressure of 15,000-25,000 atm. British Pat. No. 854,207 (1960) discloses the producing of a solid product by the action of large amounts of boron trifluoride on allyl alcohol, but the resulting product has not been proved to be polyallyl alcohol.

Also known in the art is a method of producing high-molecular weight polyallyl alcohol (mol. wt. $4 \times 10^4$) by the action of high energy radiation on the monomer. However, the polymerization rate proves to be low and requires large doses of radiation (up to $1.5 \times 10^9$ rads for 100 percent conversion).

It is an object of the present invention to provide a novel method for producing high-molecular weight polyallyl alcohol.

Another object of the invention is to ensure the production of high-molecular weight polyallyl alcohol by direct polymerization of the monomer.

Still another object of the invention is the production of polyallyl alcohol with high rates of polymerization.

These and other objects have been accomplished by the provision of a method for producing high-molecular weight polyallyl alcohol by the polymerization of allyl alcohol in the presence of an inorganic complexing agent which forms a coordination bond with the functional group of said monomer under the action of a radical initiator.

It is recommended to effect polymerization of allyl alcohol with the molar ratio of the allyl alcohol to the complexing agent being from 1:0.1 to 1:1. Such molar ratios ensure homogeneity of the reaction mixture. Should the monomer-to-complexing agent ratio exceed 1:1, the rate of the process will be lower, which is undesirable.

As the complexing agent it is expedient to use salts of metals of group I or II of the Periodic Table, such as LiCl, LiNO$_3$, CaCl$_2$, Na$_2$SO$_4$, MgCl$_2$, Mg(ClO$_4$)$_2$.

Besides these salts, use may also be made of inorganic acids as the complexing agent, such as nitric acid, sulphuric acid, hydrochloric acid, ortho- and metaphosphoric acids. Other inorganic acids may also be used, e.g., chloric acid.

Hydrochloric, sulphuric, orthophosphoric or metaphosphoric acid should be taken either concentrated, or diluted with polar solvents, such as water, acetone, ethanol, methanol, propyl or butyl alcohol. A high polymerization rate, however, is attained, if said acids are concentrated. As to nitric and chloric acid, they should be used only as solutions in polar solvents, since when concentrated they cause resinification of the products.

The polymerization of allyl alcohol in the presence of said complexing agents is initiated by radical initiators through the use of high energy radiation, for example, by irradiating with γ-rays of Co$^{60}$ or with a mixed radiation of a nuclear reactor, which radiation consists of neutrons and γ-rays, or with X-rays, or with fast electrons of an electron accelerator, or, else, with ultraviolet radiation.

When employing said types of radiation, for producing high-molecular weight polyallyl alcohol the required radiation dose should be within $1.10^7$ to $1.10^{10}$ rads. This dose depends on the amount of said complexing agent in the reaction mixture. Thus, for example, for producing polyallyl alcohol with the mol. wt. $1.10^5$ in the course of polymerization with the molar ratio between the allyl alcohol and the complexing agent equal to 1:1 the required radiation dose should be $1.10^7$ rads. The polymerization of the monomer in the presence of said complexing agents is carried out within a wide range of temperatures from 0° to 200° C. Heating within the indicated range of temperatures somewhat increases the polymerization rate. However, the polymerization is adequately high also at temperatures of 18° to 25° C.

The process of polymerization of allyl alcohol in the presence of said complexing agents can be initiated also by substances decomposing into radicals under heating or under the effect of ultraviolet radiation at a temperature of 0° to 30° C.

Such substances can be various peroxides, such as hydrogen peroxide, benzoyl peroxide, tert. butyl peroxide, tert. butyl hydroperoxide, cumene hydroperoxide, organic percarbonates and inorganic persulphates, as well as aliphatic azo compounds, e.g., dinitrile of azo-bisisobutyric acid. Radical initiators for the polymerization of allyl alcohol in the presence of an inorganic acid may be potassium persulphate and said peroxides in combination with reducing agents, such as quinone, aliphatic, aromatic, secondary and tertiary amines, as well as variable valency metals or salts thereof. Said redox system is recommended to be employed when polymerizing allyl alcohol in the presence of a complexing agent taken in the form of a solution in the above-said polar solvent. When using potassium persulphate as the initiator, the complexing agent should be taken in an aqueous solution, since it is poorly soluble in other polar solvents.

The polymerization of allyl alcohol under the effect of the initiator, that is, a substance decomposing into radicals, is carried out at a temperature corresponding to that of the decomposition of the selected initiator.

Practically the present method is effected in a rather simple way. Allyl alcohol and said complexing agent are mixed in molar ratios from 1:0.1 to 1:1 and subjected to one of the above-described initiating procedures during a period of time sufficient for the formation of a high-molecular weight product. The time of initiation depends on the polymerization rate. The polymerization rate may vary and depends on the selected complexing atent, on its ratio to the monomer, and on the initiation and temperature conditions adopted. On completion of the polymerization the polymer is separated from the complexing agent by various possible methods. Thus, for example, the complexing agent may be precipitated by a saturated solution of alkali (NaOH, KOH), or the polymer solution in methanol containing a complexing agent may be mixed with ethyl acetate. In this case the polymer precipitates and the complexing agent remains in the solution and can later be regenerated. Besides these techniques the polymer can be separated from the complexing agent by dialysis. The complexing agent separated by the dialysis procedure also can be regenerated.

The separation of the polymer from the complexing agent by dialysis is preferable, since the dialysis process is technologically well developed, e.g., for producing viscose rayon.

The present invention makes it possible to obtain a high-molecular weight product with a molecular weight of $4.10^4$ and higher (up to $5.10^5$). The obtained product is a solid amorphous polymer of white color, soluble in methanol, dimethylformamide, in hot water and in other polar solvents. The molecular weight of the polymer increases with the depth of conversion and with the concentration of the complexing agent. The polymer features a high adhesion to glass and metal (150 KG/cm$^2$), a high light and chemical resistance, as well as thermal shock resistance in air up to 300° C. These characteristics are much superior than those of polyvinyl alcohol. The obtained polymer is easily acetylated by mono- and bifunctional aldehydes, esterified by organic acids, by orthophosphorous and hypophosphorous acids, whereby it becomes possible to obtain organo-phosphorus derivatives of polyallyl alcohol, and reacts with mono- and diisocyanates. These reactions make it possible to essentially modify the properties of polyallyl alcohol, render it insoluble and infusible.

Polyallyl alcohol can be employed in the majority of industries in which polyvinyl alcohol and its derivatives are used, and it has a number of specific applications as well. An essential advantage of polyallyl alcohol over polyvinyl alcohol resides in its considerably higher heat and chemical resistance, particularly in the fact, that polyallyl alcohol is not dehydrated at a temperature below 300° C.

The present method makes it possible to effect polymerization of allyl alcohol on an industrial scale, since the involved process proves to be simple from the engineering standpoint, and the complexing agents required for carrying it into effect are readily available, cheap, and can be regenerated.

For a better understanding of the present invention, given hereinbelow are illustrative examples of carrying out the proposed method.

EXAMPLE 1

A solution containing 27 wt. percent of $CaCl_2$ in allyl alcohol was prepared (with the molar ratio of allyl alcohol to $CaCl_2$ being 1:0.5) and irradiated with $\gamma$-rays of $Co^{60}$ at a temperature of 25° C at a dose rate of 300 r/sec during 10 hours. The polymerization rate in this case was 1.5 percent conversion per hour. On completion of the polymerization polyallyl alcohol was separated from $CaCl_2$ by precipitating it with a saturated solution of NaOH at 20° C, the resulting precipitate being $Ca(OH)_2$ and the polymer remaining in the solution being isolated by the evaporation of the solvent.

The polymer produced under these conditions was a solid product with a molecular weight of $5.10^5$. When allyl alcohol was polymerized without $CaCl_2$, the polymerization rate was 0.15 percent conversion per hour, and the molecular weight of the polymer was $< 1.10^3$. Thus, with the introduction of $CaCl_2$ into allyl alcohol the polymerization rate and the molecular weight of the polymer increased ten times as compared with the case of effecting polymerization of allyl alcohol without the use of $CaCl_2$.

EXAMPLE 2

A solution containing 15 wt. per cent of $CaCl_2$ in allyl alcohol was prepared, their molar ratio thus being 0.22:1. The solution was irradiated with a mixed radiation of a nuclear reactor at a temperature of 25° C during 10 hours at a dose rate of 300 r/sec. Under these conditions the polymerization rate was 0.75 percent conversion per hour. On completion of the polymerization the polymer was separated by precipitating it from the methanol solution of the reaction mixture with ethyl acetate. The molecular weight of the produced polymer was $2.10^4$. From Examples 1 and 2 it can be seen, that the polymerization rate and the molecular weight of polyallyl alcohol increase with an increase in the concentration of the complexing agent.

EXAMPLE 3

A solution of $MgCl_2$ in allyl alcohol was prepared with the molar ratio of the monomer to the complexing agent being 1:0.5. The polymerization was initiated by fast electrons from an electron accelerator having an energy of 1.6 Mev at 20° C and at a dose rate of 1,200 r/sec during 1 hour. The polymerization rate of the alcohol-$MgCl_2$ system was 18 percent conversion per hour, which was 30 times higher than the polymerization of allyl alcohol without $MgCl_2$. The product obtained under these conditions was separated by a method similar to that described in Example 2, and the properties of the product were close to those of the polymer described in Example 1.

EXAMPLE 4

A solution of LiCl in allyl alcohol was prepared with the molar ratio of the monomer to LiCl being 1:0.2. The polymerization was carried out by irradiation with X-rays at a dose rate of 50 r/sec at 40° C. The polymerization rate of the allyl alcohol-LiCl system was 0.1 percent conversion per hour, which was 4 times higher than the polymerization rate of allyl alcohol under the same conditions but without the use of the complexing agent. The product obtained under these conditions was separated from the complexing agent, LiCl, by dialysis, and featured properties were similar to those of the polymer described in Example 1.

EXAMPLE 5

A solution of $ZnBr_2$ in allyl alcohol was prepared with the molar ratio of the monomer to $ZnBr_2$ being 1:1. The polymerization was carried out in the presence of benzoyl peroxide decomposing under the effect of ultraviolet radiation with a wavelength of 300 m$\mu$ at 25° C. The polymerization rate was 3 percent conversion per hour, which was higher than the polymerization rate of allyl alcohol without $ZnBr_2$ by as much as 29 times. The polymer was separated by a method similar to that described in Example 4. The properties of the polymer were similar to those of the polymer described in Example 1.

EXAMPLE 6

A mixture of allyl alcohol and an aqueous solution containing 25 wt. percent of hydrochloric acid was prepared. Allyl alcohol and the aqueous solution of HCl were taken in such amounts as to make the molar ratio of the alcohol to HCl to be 1:1. The polymerization was initiated at 20° C by a redox system containing $FeCl_2$ and hydrogen peroxide. The polymerization rate was 1.5 percent conversion per hour, which was higher by as much as 10 times than the polymerization rate of allyl alcohol without the acid. The polymer was separated by a method similar to that described in Example 4. The properties of the polymer were similar to those described in Example 1.

EXAMPLE 7

A mixture of concentrated hydrochloric acid and allyl alcohol with the molar ratio of allyl alcohol to hydrochloric acid of 1:0.33 was prepared. The mixture was irradiated with $\gamma$-rays of $Co^{60}$ at 25° C, the dose rate being 900 r/sec. The polymerization rate in the presence of hydrochloric acid was 7.2 percent conversion per hour, which is 16 times higher than the polymerization rate of allyl alcohol without the hydrochloric acid. The polymer was separated as described in Example 4. The properties of the product were similar to those described in Example 1.

EXAMPLE 8

A mixture of concentrated phosphoric acid and allyl alcohol with the molar ratio of allyl alcohol to phosphoric acid of 1:1 was prepared. The mixture was irradiated with ultraviolet radiation at 25° C. The polymerization rate in the presence of phosphoric acid was 2.1 percent conversion per hour, which was 30 times higher than the polymerization rate of allyl alcohol without the phosphoric acid. The polymer separation was effected similarly to the case described in Example 4. The properties of the product were close to those of the polymer described in Example 1.

EXAMPLE 9

A mixture of allyl alcohol and an aqueous 75 percent solution of phosphoric acid with the molar ratio of allyl alcohol to acid solution equal to 1:1 was polymerized in the presence of an initiating system containing benzoyl peroxide and diphenyl amine at 20° C. The polymerization rate was 4.5 percent conversion per hour, which was 20 times higher than the polymerization rate of allyl alcohol without the complexing agent. The method of the polymer separation was similar to that described in Example 4. The properties of the product were similar to those of the product described in Example 1.

EXAMPLE 10

A solution of $ZnBr_2$ in allyl alcohol was prepared, with the molar ratio of the monomer to $ZnBr_2$ being 1:0.5. The solution was subjected to polymerization in the presence of dinitrile of azo-bisisobutyric acid decomposing at 60° C. The polymerization rate was 2.5 percent conversion per hour, which was 16 times higher than the polymerization rate of allyl alcohol without $ZnBr_2$. The polymer was separated as described in Example 4. The properties of the polymer were similar to those of the product described in Example 1.

What is claimed is:

1. A method of producing high-molecular weight polyallyl alcohol by polymerizing allyl alcohol in the presence of a complexing agent selected from the group consisting of inorganic salts of metals of Group I and II of the Periodic Table and nitric acid, sulphuric acid, hydrochloric acid, chloric acid, orthophosphoric acid and metaphosphoric acid, under the action of a radical initiator in a homogeneous system using a molar ratio of allyl alcohol to the complexing agent of from 1:0.1 to 1:1.

2. A method as in claim 1 wherein the polymerization is carried out in bulk.

3. The method of claim 1, wherein the complexing agent is a salt selected from the group consisting of $LiCl$, $LiNO_3$, $CaCl_2$, $Na_2SO_4$, $MgCl_2$, $MgSO_4$, and $Mg(ClO_4)_2$.

4. The method of claim 1, wherein the polymerization of allyl alcohol is carried out in the presence of an inorganic acid in a polar solvent medium.

5. The method of claim 4, wherein the polar solvent is selected from the group consisting of water, acetone, and a lower aliphatic alcohol having from one to four carbon atoms.

6. The method of claim 1, wherein the polymerization of allyl alcohol is carried out under the effect of a high energy radiation at a dose rate of $1.10^7$ to $1.10^{10}$ rads at a temperature not higher than 200° C.

7. The method of claim 6, wherein the polymerization of allyl alcohol is carried out under the effect of $\gamma$-rays of $Co^{60}$.

8. The method of claim 6, wherein the polymerization of allyl alcohol is carried out under the effect of a mixed radiation of a nuclear reactor, which radiation consists of neutrons and $\gamma$-rays.

9. The method of claim 6, wherein the polymerization of allyl alcohol is carried out under the effect of X-rays.

10. The method of claim 6, wherein the polymerization is carried out through the use of fast electrons from an electron accelerator.

11. The method of claim 6, wherein the polymerization is carried out under the effect of ultraviolet radiation.

12. The method of claim 1, wherein the polymerization of allyl alcohol is carried out under the effect of substances that decompose into radicals when heated or subjected to ultraviolet radiation at temperatures from 0° to 30° C.

13. The method of claim 12, wherein the substance decomposing into radicals is a peroxide selected from the group consisting of hydrogen peroxide, benzoyl peroxide, tertiary butyl peroxide, organic percarbonate, and inorganic persulphate.

14. The method of claim 12, wherein the substance decomposing into radicals is an aliphatic azo compound.

15. The method of claim 13, wherein the radical initiator is a redox system comprising said peroxide and a reducing agent selected from the group consisting of quinone, aliphatic, aromatic, secondary and tertiary amines, variable valency metals and their salts.

16. A method as in claim 15 wherein the variable valency metal is divalent iron.

* * * * *